Jan. 18, 1955
J. LUSTIG
2,699,779
WET DRESSING FOR MEDICAL USES
Filed May 17, 1952
2 Sheets-Sheet 1
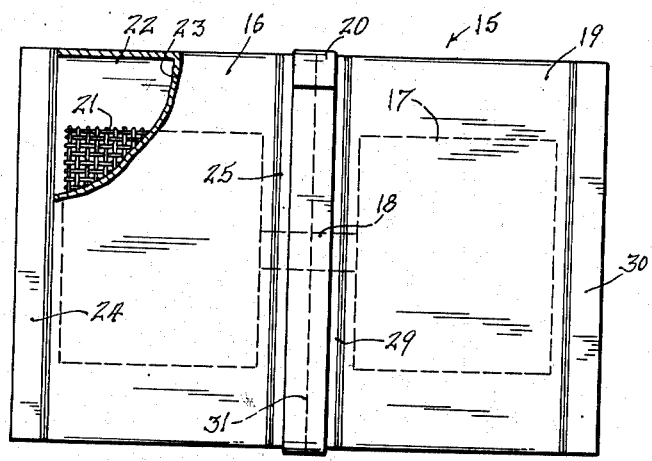
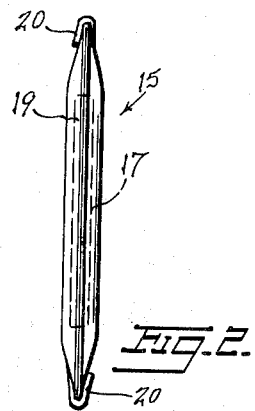
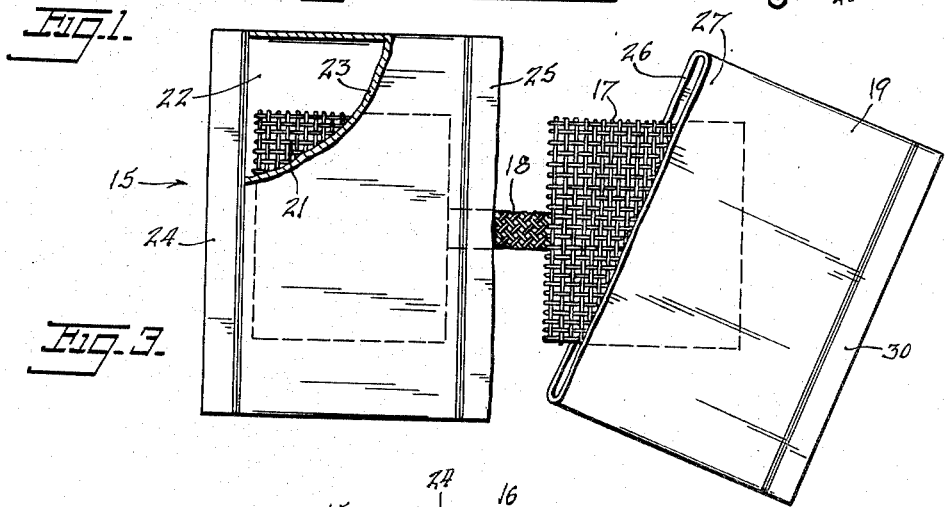
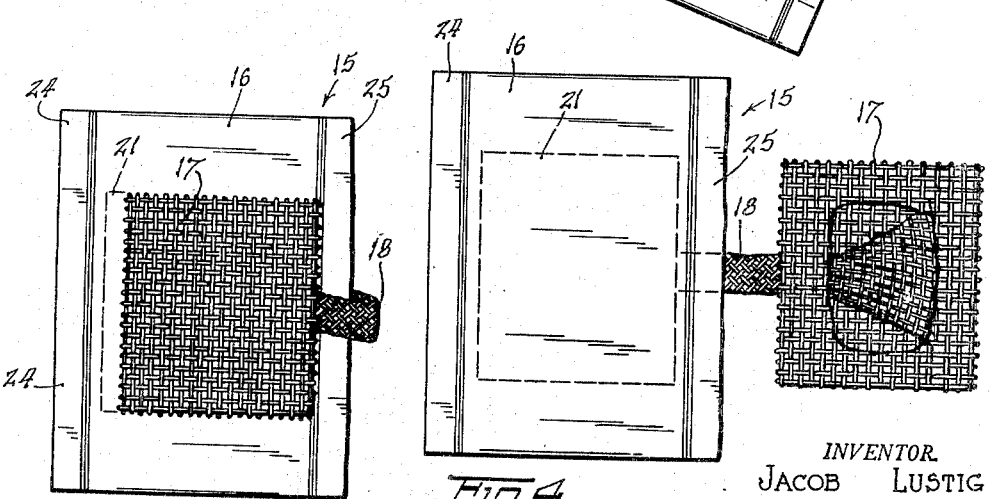
INVENTOR.
JACOB LUSTIG
BY
ATTORNEY

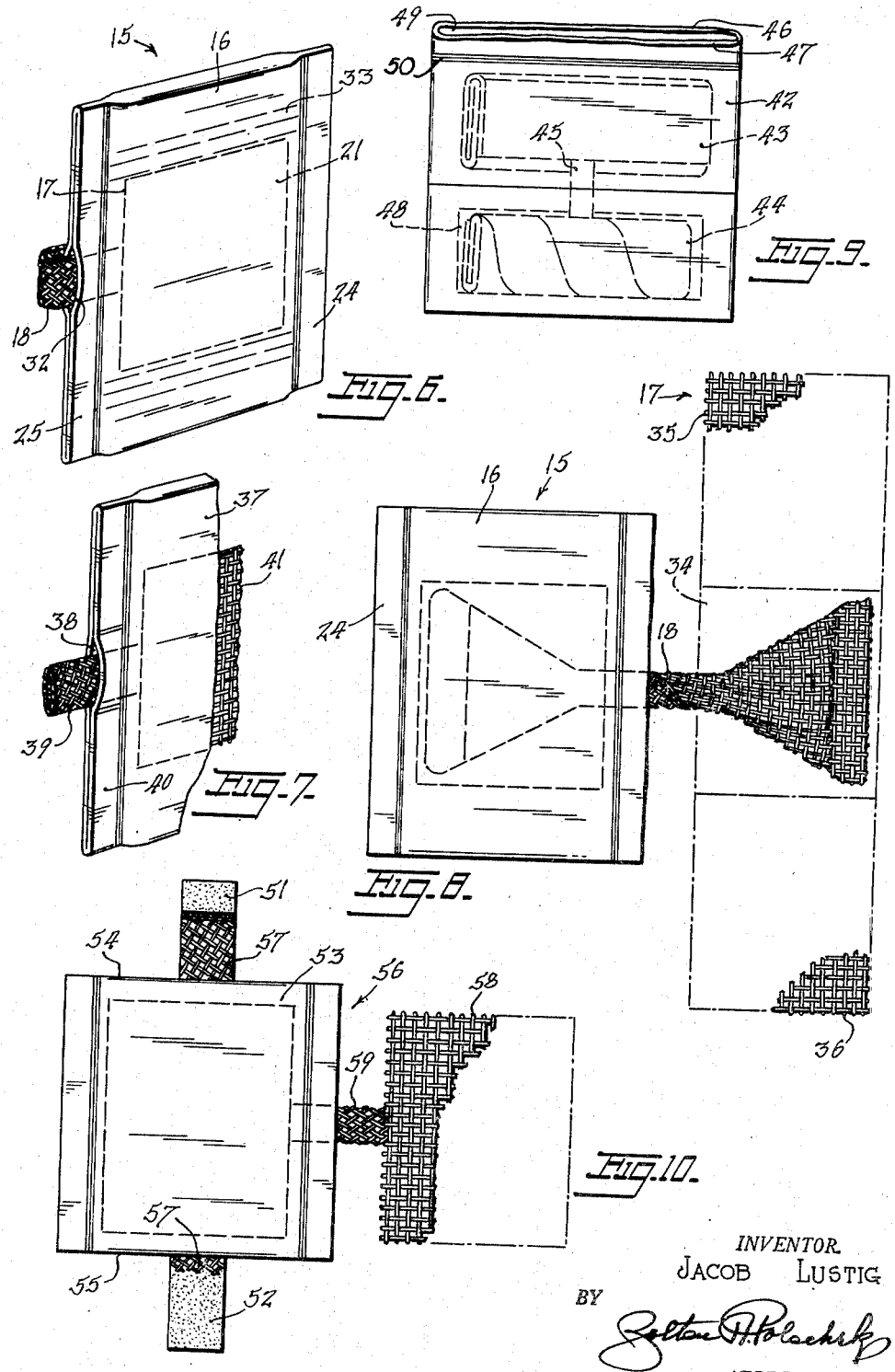

United States Patent Office 2,699,779
Patented Jan. 18, 1955

2,699,779
WET DRESSING FOR MEDICAL USES

Jacob Lustig, New York, N. Y.

Application May 17, 1952, Serial No. 288,391

13 Claims. (Cl. 128—268)

This invention relates to new and useful improvements in wet dressings for medical uses.

Wet dressings are essential in the treatment of fungus infections of the skin, contact dermatitis, ulcers, allergic eczema, pruritus, erysipelas, insect bites, traumatic injuries, acute infections such as carbuncles, anthraces, furuncles and the like and lymphangitis. Such dressings perform physical actions of detergence, heat dispersion or heat retention (poultices) and chemical actions of antisepsis, astringency and buffer action.

The present invention proposes the construction of a completely sterile dressing which is available for immediate use to be applied as a wet dressing to a wound, infection, or skin condition where such a mode of therapy is indicated and which will remain continuously wet for an extended period of time thus eliminating frequent changes of dressings.

Another object of the invention proposes forming a dressing with an attached fluid container which can be applied conveniently and comfortably with the dressing and which will constantly apply any fluid such as an antiseptic, germicide, antibiotic, or a bland soothing agent to any area of the body.

Still further, the present invention proposes constructing the wet dressing so that it will stay in place once applied and permit the patient to be ambulating or to sleep without interrupting the treatment.

As a further object, the present invention proposes a wet dressing construction which will not require the cooperation of a patient and with which there is no need to keep wetting the dressing from an outside source.

The present invention further proposes a novel arrangement of a wet dressing construction to which heat may be applied to make the dressing a heat conductor and in which the dressing can be covered by the attached fluid container, and a heating pad, bottle, or other device placed on top of the fluid container to prevent direct contact of the wound with heating unit; and the placing of the fluid container on top of the dressing without heat can be used to prevent clothing or bed linens from coming in contact with the wet dressing.

Another object of the invention is to provide a new wet dressing which will properly function to cool the skin and relieve capillary congestion; cause heat dispersion by evaporation; encourage drainage in open lesions; relieve itching; create a buffer action on skin surface; produce an astringent action on the area where it is applied; and not stick to a wound.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front view of the wet dressing of the present invention with a corner of the fluid container envelope broken away.

Fig. 2 is an end view of Fig. 1.

Fig. 3 is a view similar to Fig. 1 showing the protective envelope torn off and the dressing partly removed therefrom.

Fig. 4 is a front view of the wet dressing with the protective envelope completely removed from the dressing and part of the dressing broken away.

Fig. 5 is a front view of the dressing with the fluid container overlying it for application in this relation.

Fig. 6 is a perspective view showing the outside of the fluid envelope with the dressing therebeneath, fluid being in the envelope when it is sealed.

Fig. 7 is a fragmentary view similar to Fig. 6 showing a modification wherein fluid can be injected into the container by the user.

Fig. 8 is a view similar to Fig. 4 but with the dressing opened up to show details of construction.

Fig. 9 is a perspective view of a further modification.

Fig. 10 is a view similar to Fig. 4 but showing a modification wherein adhesive tape tabs are provided.

The wet dressing 15, in accordance with the first form of the invention illustrated in Figs. 1–6, inclusively and in Fig. 8 has a flat fluid tight pouch or fluid container 16, connected with a dressing 17, by a fluid conveying conduit or wick 18.

A protective envelope 19, encases the dressing 17, to keep it sterile and is removably secured to the fluid container pouch or impervious envelope 16, a removable tear strip or tape 20, covering the juncture.

Wick 18, has one end extending into the fluid pouch 16, and connected with a gauze fluid conducting pad 21, sealed within the pouch. The other end of the wick is connected with dressing 17, which preferably is an absorbent gauze bandage or dressing.

The fluid pouch 16 and protective discardable envelope 19 may be made of the same type material such as thermoplastic sheeting or of different materials. The fluid pouch 16 has spaced walls 22 and 23 sealed together at the ends 24 and 25. The sealing of the end portions 24 and 25 may be done by dielectric or other type of heat sealing or by cement or other well known sealing means. The protective envelope has spaced side walls 26 and 27 (Fig. 3) sealed together at end strips or portions 29 and 30 (Fig. 1). The sealed end portions 25 and 29 are shown integrally joined in Fig. 1 with a perforated tear line 31 between them and the tear strip or tape 20 overlies the tear line. Thus the protective envelope 19 is connected to the pouch 16 and adapted to be torn away from it and off the dressing 17 to apply the dressing.

Fluid pouch 16 partially covers the wick 18 and the protective envelope 19 encasing the dressing completes the covering of the wick. The wick extends into the fluid holding pouch 16 through an opening 32 (see Fig. 6) in sealed end portion 25 of the pouch. The wick opening 32 fits closely around the wick so that a fluid 33 may be sealed in the pouch by the maker.

Wick 18 may be any desired length but preferably is long enough for the dressing 17 to be folded under the pouch 16 or the pouch folded over the dressing 17 as shown in Figs. 5 and 6. The pad containing envelope or pouch 16 is shown larger than the dressing 17 and positioned adjacent to it so as to be foldable over it. Thus the pouch can be applied with the dressing overlying it and protecting it as well as protecting clothing or bed linen from the dressing 17 removed from its protective envelope 19 and wet.

The wick 18 can be made of any fluid conveying material and may function alone or in conjunction with the dressing 17 to provide a fluid conveying means connecting the fluid container 16 with the dressing 17. As shown in Figs. 4 and 8, the wick 18 is a length of gauze twisted intermediate its ends to serve as a wick. The flat untwisted ends of the wick gauze extend into the fluid conducting pad 21 and into the dressing 17 respectively.

Dressing 17, as shown in Figs. 4 and 8 is made of a single length of gauze having a flat center portion 34 underlying one end of the wick gauze and flat end portions 35 and 36 foldable over it. The fluid conducting pad 21 may be similarly made of a third length of gauze.

In the modification shown in Fig. 7, fluid is not supplied in the pouch or envelope 37 but a fluid injecting opening 38 is provided adjacent the wick 39 extending through the sealed end 40 of the pouch into the pouch. This permits a dry dressing to be supplied to the user who may inject any fluid desired into the pouch to saturate the fluid conveying pad 41 connected with one end of wick 39.

Fig. 9 shows a further modification in which a single thermoplastic envelope 42 encases a dressing or bandage 43, a fluid conveying pad 44 and a wick 45 connecting the dressing and the pad. The side walls 46 and 47 of the envelope are sealed together adjacent to and around the pad 44 and a portion of the wick 45 to provide a fluid chamber 48 containing the pad. Spaced from the upper open end 49 of the envelope, the side walls of the envelope are sealed together along a narrow strip 50 to enclose the dressing 43 in a sterile removable casing. When it is desired to remove the envelope the side walls 46 and 47 are pulled apart at the open end 49 of the envelope to part the seal strip 50 and to remove the dressing 43 as by tearing or cutting the envelope from around it or folding it back over its pad containing portion.

The modified form of the invention shown in Fig. 10 is characterized by the provision of adhesive tape tabs 51 and 52 secured to the fluid envelope 53, extending from its sides 54 and 55 and forming a part of the wet dressing 56. The tabs have their adhesive covered with removable crinoline 57. Attachment of the wet dressing 56 may be made to a part of the body under treatment by removing the crinoline 57, placing the gauze dressing 58 next to the body, folding the wick 59 so as to cover the gauze dressing 58 with the fluid envelope 53 and pressing the adhesive tape tabs to the body, the tabs being so arranged that the tacky side is down when the envelope 53 covers the gauze dressing 58. Adhesive or other adhering materials from an external source (not shown) or bandaging materials or tapes (not shown) may be used in place of tabs 51 and 52 to attach the wet dressing 56 or the other forms of the wet dressing shown in the several figures and described above.

In any of the forms shown, a wet dressing is provided for immediate use.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A wet dressing comprising a fluid tight pouch having a wick opening, an absorbent pad in the pouch, a wick having one end extending through the pouch opening and connected with the pad, and an absorbent dressing connected with the other end of the wick to draw fluid from the pouch steadily to the dressing to keep the dressing wet, said pouch partially covering the wick and a sealed envelope encasing the dressing and completing the covering of the wick, said envelope being connected to the pouch and adapted to be torn away from it and off the dressing to apply the dressing.

2. A wet dressing comprising a fluid tight pouch having a wick opening, an absorbent pad in the pouch, a wick having one end extending through the pouch opening and connected with the pad, and an absorbent dressing connected with the other end of the wick to draw fluid from the pouch steadily to the dressing to keep the dressing wet, a sealed envelope encasing the dressing, said envelope being connected to the pouch and adapted to be torn away from it and off the dressing to apply the dressing and a wetting fluid in the pouch.

3. A wet dressing comprising a fluid tight pouch having a wick opening, an absorbent pad in the pouch, a wick having one end extending through the pouch opening and connected with the pad, and an absorbent dressing connected with the other end of the wick to draw fluid from the pouch steadily to the dressing to keep the dressing wet, said pouch partially covering the wick and a sealed envelope encasing the dressing and completing the covering of the wick, said envelope being connected to the pouch and adapted to be torn away from it and off the dressing to apply the dressing, said pouch opening being adapted to have fluid injected therethrough to saturate the gauze pad in the pouch.

4. A wet dressing comprising a gauze fluid conducting pad, an absorbent dressing, and a wick connecting the pad and the dressing, an impervious envelope encasing the pad and a portion of the wick so that fluid in the envelope can pass out only through the wick, fluid in the envelope, and a second envelope encasing the dressing and the rest of the wick to keep them sterile, said second envelope being adapted to be removed from the dressing to apply the dressing.

5. A wet dressing comprising a gauze fluid conducting pad, an absorbent dressing, and a wick connecting the pad and the dressing, an impervious envelope encasing the pad and a portion of the wick so that fluid in the envelope can pass out only through the wick, fluid in the envelope, and a second envelope encasing the dressing and the rest of the wick to keep them sterile, said second envelope being adapted to be removed from the dressing to apply the dressing, said pad containing envelope being larger than the dressing and positioned adjacent to it and foldable over it to be applied with the dressing overlying it.

6. A wet dressing comprising an absorbent fluid conducting pad, an absorbent dressing, and a wick connecting the pad and the dressing, an impervious thermoplastic envelope encasing the pad and a portion of the wick, said envelope being adapted to have fluid fill the envelope and saturate the pad, and a removable thermoplastic envelope encasing the dressing and the remaining portion of the wick to keep them sterile.

7. A wet dressing comprising an absorbent fluid conducting pad, an absorbent dressing, and a wick connecting the pad and the dressing, an impervious thermoplastic envelope encasing the pad and a portion of the wick, said envelope being adapted to have fluid fill the envelope and saturate the pad, and a removable thermoplastic envelope encasing the dressing and the remaining portion of the wick to keep them sterile, said pad containing envelope being larger than the dressing and positioned adjacent to it and foldable over it to be applied with the dressing overlying it.

8. A dressing adapted for use as a wet dressing comprising a length of gauze twisted intermediate its ends to serve as a wick, a second length of gauze having a flat center portion underlying one end of the wick gauze and flat end portions folded over it, a third length of gauze having a flat center portion underlying the other end of the wick gauze and flat end portions folded thereover to serve as a dressing, an impervious envelope encasing said second length of gauze and the end of the wick gauze therein, a removable and discardable envelope covering the dressing gauze and the twisted exposed portion of the wick.

9. A dressing adapted for use as a wet dressing comprising a length of gauze twisted intermediate its ends to serve as a wick, a second length of gauze having a flat center portion underlying one end of the wick gauze and flat end portions folded over it, a third length of gauze having a flat center portion underlying the other end of the wick gauze and flat end portions folded thereover to serve as a dressing, an impervious envelope encasing said second length of gauze and the end of the wick gauze therein, a removable and discardable envelope covering the dressing gauze and the twisted exposed portion of the wick, said impervious envelope being adjacent to and foldable over the dressing to be applied with it.

10. A wet dressing comprising a gauze fluid conducting pad, an absorbent dressing, and a wick connecting the pad and the dressing, an impervious envelope encasing the pad and a portion of the wick so that fluid in the envelope can pass out only through the wick, fluid in the envelope, and a second envelope encasing the dressing and the rest of the wick to keep them sterile, said second envelope being adapted to be removed from the dressing to apply the dressing, said pad containing envelope being larger than the dressing and positioned adjacent to it and foldable over it to be applied with the dressing overlying it, and adhesive tape tabs secured to the pad containing envelope and having free ends extending beyond it and the dressing, tacky side down when the envelope is folded over the dressing.

11. A wet dressing comprising an absorbent fluid conducting pad, an absorbent dressing, and a wick connecting the pad and the dressing, an impervious thermoplastic envelope encasing the pad and a portion of the wick, said envelope being adapted to have fluid fill the envelope and saturate the pad, and a removable thermoplastic envelope encasing the dressing and the remaining portion of the wick to keep them sterile, said pad containing envelope being larger than the dressing and positioned adjacent to it and foldable over it to be applied with the dressing overlying it, and adhesive tape tabs secured to the pad containing envelope and having free ends extending beyond it and the dressing, tacky side down when the envelope is folded over the dressing.

12. A dressing adapted for use as a wet dressing comprising a length of gauze twisted intermediate its ends to serve as a wick, a second length of gauze having a flat center portion underlying one end of the wick gauze and flat end portions folded over it, a third length of gauze having a flat center portion underlying the other end of the wick gauze and flat end portions folded thereover to serve as a dressing, an impervious envelope encasing said second length of gauze and the end of the wick gauze therein, a removable and discardable envelope covering the dressing gauze and the twisted exposed portion of the wick, said impervious envelope being adjacent to and foldable over the dressing to be applied with it and adhesive tape tabs secured to the pad containing envelope and having free ends extending beyond it and the dressing, tacky side down when the envelope is folded over the dressing.

13. A wet dressing comprising a gauze fluid conducting pad, an absorbent dressing, and a wick connecting the pad and the dressing, an impervious envelope encasing the pad and a portion of the wick so that fluid in the envelope can pass out only through the wick, fluid in the envelope, and a second envelope encasing the dressing and the rest of the wick to keep them sterile, said second envelope being adapted to be removed from the dressing to apply the dressing, said pad containing envelope being larger than the dressing and positioned adjacent to it and foldable over it to be applied with the dressing overlying it, and adhesive tape tabs secured to the pad containing envelope and having free ends extending beyond it and the dressing, tacky side down when the envelope is folded over the dressing, said tabs being covered with removable crinoline.

References Cited in the file of this patent

UNITED STATES PATENTS

| | | |
|---|---|---|
| 588,091 | Sanche | Aug. 10, 1897 |
| 1,293,401 | Gibson | Feb. 4, 1919 |
| 2,493,416 | Negri | Jan. 3, 1950 |